United States Patent
Burns et al.

(10) Patent No.: US 9,568,978 B2
(45) Date of Patent: Feb. 14, 2017

(54) CONTROLLING POWER CONSUMPTION IN PROCESSOR-BASED SYSTEMS AND COMPONENTS THEREOF

(71) Applicant: Intel Corporation, Santa Clara, CA (US)

(72) Inventors: James S. Burns, Cupertino, CA (US); James W. Alexander, Hillsboro, OR (US); Muralidhar Rajappa, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 436 days.

(21) Appl. No.: 14/037,686

(22) Filed: Sep. 26, 2013

(65) Prior Publication Data

US 2015/0089254 A1    Mar. 26, 2015

(51) Int. Cl.
*G06F 1/32*    (2006.01)

(52) U.S. Cl.
CPC .......... *G06F 1/3234* (2013.01); *Y02B 60/1282* (2013.01)

(58) Field of Classification Search
None
See application file for complete search history.

(56) References Cited

U.S. PATENT DOCUMENTS

| | | | | |
|---|---|---|---|---|
| 7,818,592 | B2 * | 10/2010 | Meier | G06F 9/3017 |
| | | | | 713/300 |
| 9,134,779 | B2 * | 9/2015 | Kuesel | G06F 1/26 |
| 2009/0070607 | A1 * | 3/2009 | Safford | G06F 1/3234 |
| | | | | 713/320 |
| 2013/0275789 | A1 * | 10/2013 | Wang | G06F 1/3209 |
| | | | | 713/320 |
| 2013/0318371 | A1 * | 11/2013 | Hormuth | G06F 1/28 |
| | | | | 713/320 |

* cited by examiner

*Primary Examiner* — Fahmida Rahman
(74) *Attorney, Agent, or Firm* — Trop Pruner & Hu, P.C.

(57) ABSTRACT

Since the maximum power consumption is largely a concern at the power supply domain, a limited number of nodes may be allowed to consume their maximum power consumption by preventing other nodes from consuming their maximum power consumption. This approach may be used either instead of or in cooperation with existing maximum power consumption regulators.

27 Claims, 5 Drawing Sheets

CONTROLLING POWER CONSUMPTION IN
PROCESSOR-BASED SYSTEMS AND
COMPONENTS THEREOF

BACKGROUND

This relates generally to controlling the consumption of power in components of processor-based systems, as well as in systems including those components.

Many processor-based systems operate from battery power supplies. As a result, power consumption is an important consideration since users do not want their devices to run out of power while in use.

Existing schemes for power consumption planning and control may reduce the operating point of a component if its power consumption exceeds a fixed threshold. One such scheme, called Fast-Running Average Power Limit (RAPL)/ ProcHot, used in some Intel® architectures, requires fast response firmware that some processors and voltage regulators do not support. See Intel® 64 and IA-32 architectures, Software Developer's Manual, Volume 3B, System Programming Guide, Part 2, Intel Corp., Order Number 253669-047US, June 2013. Also, their fixed threshold results in performance losses if even a single processor node has high power consumption.

BRIEF DESCRIPTION OF THE DRAWINGS

Some embodiments are described with respect to the following figures.

DETAILED DESCRIPTION

Figure 1:
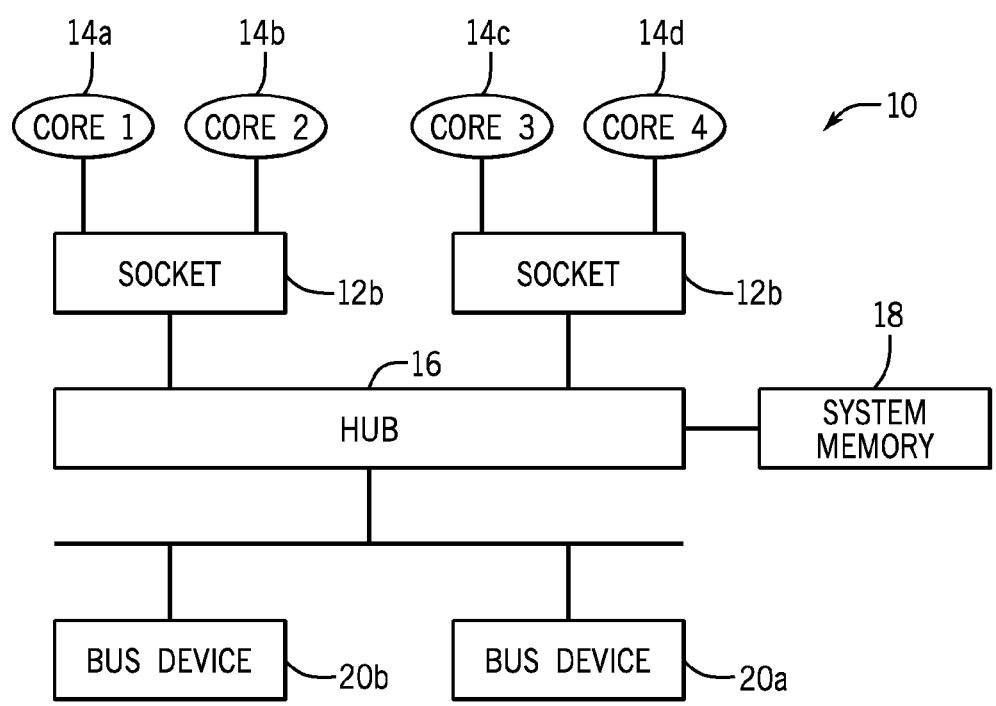
FIG. 1 is a system depiction for one embodiment.

Since the maximum power consumption is largely a concern at the power supply domain, a limited number of nodes may be allowed to consume their maximum power consumption by preventing other nodes from consuming their maximum power consumption. This approach may be used either instead of or in cooperation with existing maximum power consumption regulators.

In one embodiment, a power sharing scheme dynamically allocates credits to use a given power consumption level, such as a maximum power consumption level sometimes called turbo especially in connection with processors, to each of a plurality of nodes. (A core or processor in turbo mode operates at maximum voltage and frequency). These nodes may be power consuming components within a processor-based system such as bus devices, memories, processors, or cores within processors to give some examples.

A node, such as a core or processor, with a credit can operate in a high power consumption mode such as a turbo mode. The allocation may be based, in one embodiment, on a computed maximum power consumption of individual nodes at the highest controlled operating point and the total power available to all the nodes in the processor-based system. The capacity and cost of the overall power supply may be reduced with little to no impact on performance in some embodiments. Credits may be assigned to devices including central processing units, sockets, cores, and memories, as examples. Alternatively, credits may be Boolean (i.e. go or no go) or more finely grained to limit frequency upsides.

Thus, in some embodiments, there is a given pool of credits for a given processor-based system that has a given pool of nodes, each node may be equipped with a good citizen timer. A credit manager may be equipped with a least recently requested node table. A node with a credit can operate in a higher power consumption mode such as a turbo mode, while a node without a credit may not. In some embodiments there are fewer credits than there are nodes in the system.

Thus, the operating sequence, in one embodiment, is for a node to request a credit so that it can operate at a higher power consumption mode. If a credit is available, then the credit manager allocates the credit to the node immediately. If the credit is not currently available because of the limitation on the number of credits that are available, the credit manager may obtain a credit from another node and may provide the credit to the requesting node. In the good citizen mode, when a node is done with its credit, the node returns the credit to the credit manager.

In one embodiment, there may be two modes of operation. In the good citizen mode, a node voluntarily relinquishes the credit after its timer expires and after the last higher power consumption or turbo operation is completed by that node. The timer restarts at the end of such higher power consumption operation. The second mode is a park mode where the node keeps its credit, relinquishing that credit only when the node is asked to return the credit. The node may no longer be using the credit after its timer expires after the last turbo mode is finished. The timer restarts at the end of each such turbo mode.

The credit manager handles requests from nodes for credits. If there is a credit in the pool of available credits, then the credit manager allocates the credit to a requesting node. This continues until all the nodes with credits have been polled or until a credit has been assigned. This loop may be skipped in the good citizen mode. If a node is parking on a credit but its timer has expired, then that node's credit may be reclaimed and given to a credit requester.

If a requesting node still has not been serviced after the above operations, then the credit may be taken from the oldest node in a least recently requested table and given to the new requestor.

Other methods may be used to reallocate credits. For example, credits may have been requested and granted, but are not presently needed or used. Also, requests for credits may be made at the thread, core, or node level. If credits are allocated to a node, then they may be subdivided to the individual components. For example, per core power consumption states may allow one core to have more turbo upside than another core. In addition, credits may be deallocated based on the least recently requested table, or use other facts such as how many credits are presently assigned or how efficiently the credits are being used. For example, the least recently requested table may keep track of how long each node has kept its credit without returning it.

At boot time, there are several options. The nodes may be set to operate as good citizens or in park mode. It may also be decided how many credits are in the pool. Also, the timer period may be set.

When the system boots up, all the credits are in the pool. As the nodes continue to operate, the credits start to be used up. When the credit pool is empty in a good citizen mode, that means that the system is out of available power credits to allocate and the nodes must share the available power headroom. When credits need to be forcibly taken away from nodes whose timers have not expired, then the system is out of available power credits and the nodes must compete for power allocations.

The good citizen mode may have a potential advantage, in some embodiments, that when the system is not maxed out, credits are reassigned with minimum latency because it is more likely to have credits available in the pool. Also when the system is maxed out, credits may be reassigned with minimum latency because the credit manager reassigns based on the least recently used table. However, this mode may involve more timer tuning in some embodiments.

An advantage of a park mode, in some embodiments, is that while you have a timer you do not have to fine tune it as carefully as in the good citizen mode. For example the timer may be set to infinite and the system still works. Also if the timer is set to infinite, then the credit manager does not have to poll for a free credit because it simply reassigns based on a least recently used table. The negative in some cases is that if you set the timer to something less than infinite, there is a latency in assigning the credit because the credit manager has to search for the credit that is not being used.

With respect to performance, if the higher power consumption mode is only three settings higher than the lowest, then for a 1.7 GigaHertz processor a loss of 15% on critical mode may be encountered once in a while. But this loss may be less for higher performance processors at higher frequencies. Even if the tuning is suboptimal, it may not matter much because the nodes can always run all the way up to P1 power consumption state, according to the Advanced Configuration and Power Specification, Rev. 5 (2011).

In some embodiments the original equipment manufacturer can save money on power supplies. For a large number of small nodes, this savings may be substantial. Instead of sizing the power supply for all nodes in the highest power consumption state at the same time, the supply may be sized for only some of the nodes being in the highest power consumption mode at the same time. Savings may also be achieved from reduced bulk capacitance requirements, since a reduction in the number of components at maximum power may reduce the resulting current surge, in some embodiments.

An original equipment manufacturer may also choose to use less expensive power supplies with longer telemetry periods. If the nodes inadvertently spike the supply with simultaneous high power demands, then more expensive supplies may be required to be able to hold up long enough before the nodes find out that they need to take drastic action. With this arrangement, no drastic action may be required because the credit manager ensures that the system is always operated such that the supply may never be spiked, in some embodiments.

In one embodiment, the maximum power consumption may be limited by limiting the number of nodes that can be at the highest power consumption state at maximum speed (in the case of processors). For example, the number of sockets that can be in turbo mode at maximum speed may be limited.

In another embodiment, instead of assigning one maximum power consumption credit per central processing unit socket, the allocation may be subdivided to one credit per central processing unit core. With one credit per socket, all cores in the socket may go to the highest power consumption and to maximum speed simultaneously. With one credit per core, the number of cores simultaneously going to higher power consumption at maximum speed may be constrained.

Instead of designing turbo credits as go, no-go maximum enablers, for example, to the socket or the core, the credits may be further subdivided into speed bins. Since different operating speeds burn different amounts of power, the credits may become fractional and the pool of individual credits may be a headroom bucket. Now the budget per resource limits its maximum speed.

A fractional pool approach may be further extended to include all power consumption states not just the highest speeds. With this approach, the headroom bucket may become a compute power bucket.

Referring to FIG. 1, a processor-based system 10 may be any computer or processor-based system, especially one that runs from battery power such as a laptop computer, a tablet, a cellular telephone, a game, or a camera to mention a few examples. A hub 16 may be connected to system memory 18 and one or more sockets such as sockets 12a and 12b. Each socket 12 may connect one or more cores, including the cores 14a, 14b, 14c and 14d. The hub may be connected to a bus in turn connected to bus devices 20a and 20b. Thus, each of these components may be considered a node in the system 10. The node is any component that consumes power, in some embodiments.

Figure 2:
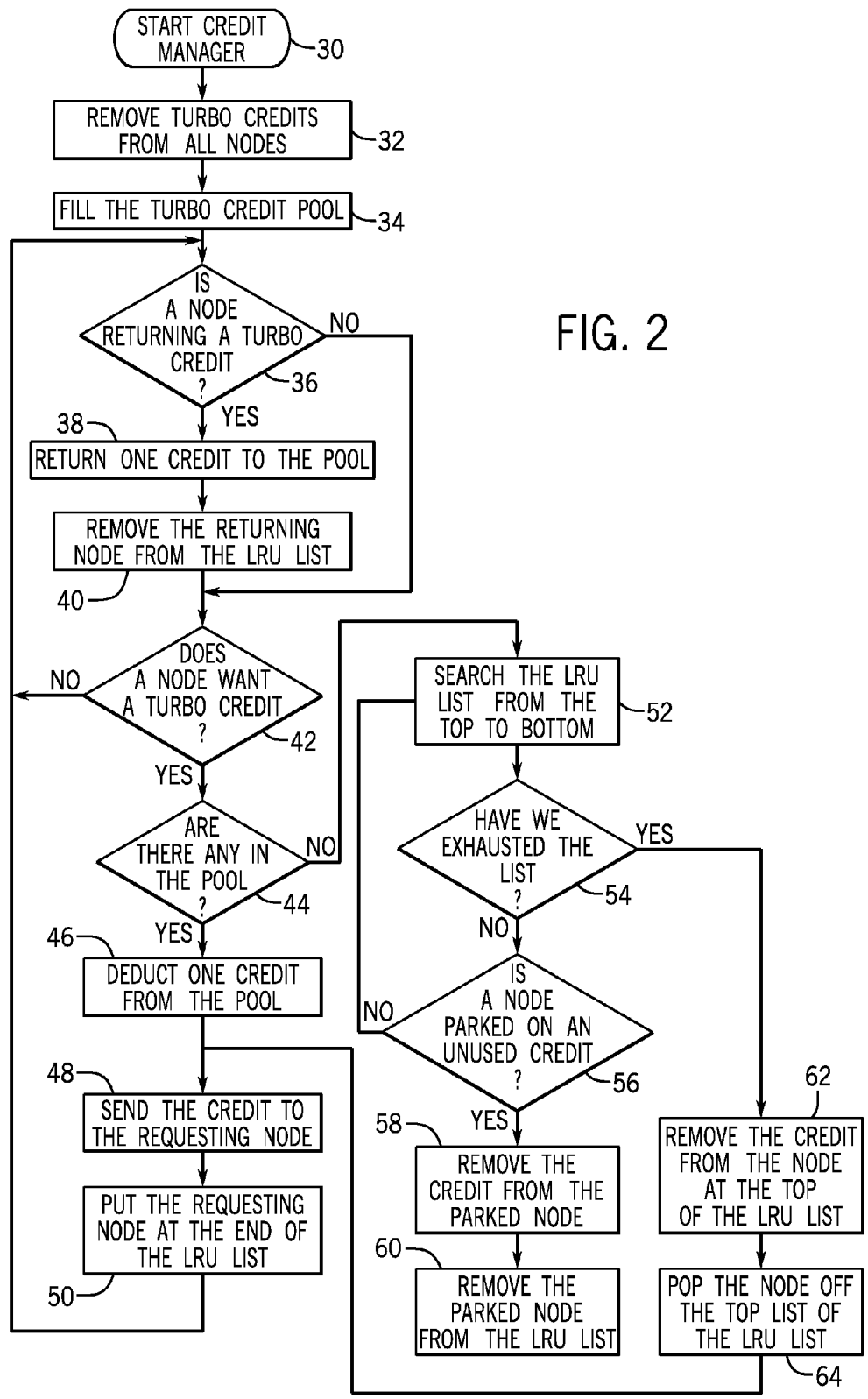
FIG. 2 is a flow chart for a start credit manager according to one embodiment.

Turning to FIG. 2, a sequence 30 for a start credit manager may be implemented in software, firmware and/or hardware. In software and firmware embodiments it may be implemented by computer executed instructions stored in one or more non-transitory computer readable media such as a magnetic, optical or semiconductor storage. It may be executed by a processor or one core, as examples.

The sequence 30 begins by removing credits from all nodes as indicated in block 32. Then the credit pool is filled as indicated in block 34. Various algorithms or heuristics may be used to decide what the maximum number of credits may be. The number may be set lower in order to use less power and to be more conservative or the number may be set higher in higher performing systems.

Next, a check at diamond 36 determines whether a node is returning a credit. If so, the credit is returned to the pool as indicated in block 38. Then the credit returning node is removed from the least recently used list as indicated in block 40. If the check at diamond 36 indicates that the node is not returning a credit then steps 38 and 40 may be skipped. Next, a check at diamond 42 determines whether a mode has requested a credit.

If so, a check at diamond 44 determines there are any credits remaining in the pool. If so, one credit may be deducted from the pool as indicated in block 46. The credit is then sent to a requesting node as indicated in block 48 and the requesting node is added at the end of the least recently used list as indicated in block 50.

If the check at diamond 44 determines that there are no credits available in the pool, then at block 52 the least recently used list may be searched from top to bottom. A check at diamond 54 determines whether the list has been exhausted. If not, a check at diamond 56 determines if a node is parked on an unused credit. If so, the credit is removed from the parked node as indicated in block 58 and the parked node is removed from the least recently used list as indicated in block 60.

If the check at diamond 54 determines that the list has been exhausted, then the credit is removed from the node at the top of the least recently used list as indicated in block 62. Then the node is also removed from the top of the list as indicated in block 64.

Figure 3:
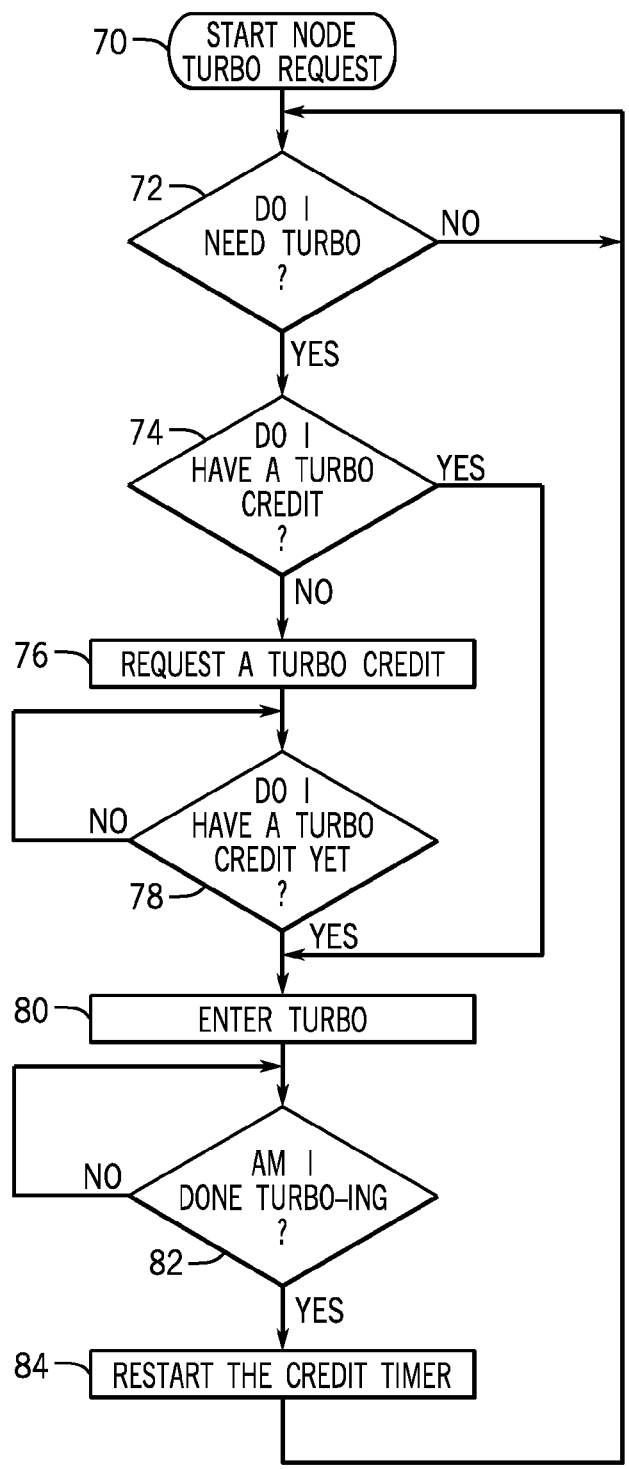
FIG. 3 is a flow chart for a start node turbo request according to one embodiment.

A sequence 70 for start node turbo request, shown in FIG. 3, may be implemented in software, firmware and/or hardware. In software and firmware embodiments, it may be implemented by computer executed instructions stored in one or more non-transitory computer readable media such as magnetic, optical or semiconductor storage.

The sequence 70 begins by checking at diamond 72 whether a higher power consumption mode (such as a turbo mode) is needed. If so, a check at diamond 74 determines whether there is a credit for such a higher power consumption mode. If not, a credit may be requested at block 76. Then a check at diamond 78 determines if the credit has been obtained. If so, the turbo mode is entered at block 80.

A check at diamond 82 determines whether or not the node is done with the higher power consuming mode. If so, the credit timer is restarted at 84 and otherwise it continues operating in the turbo mode.

Figure 4:
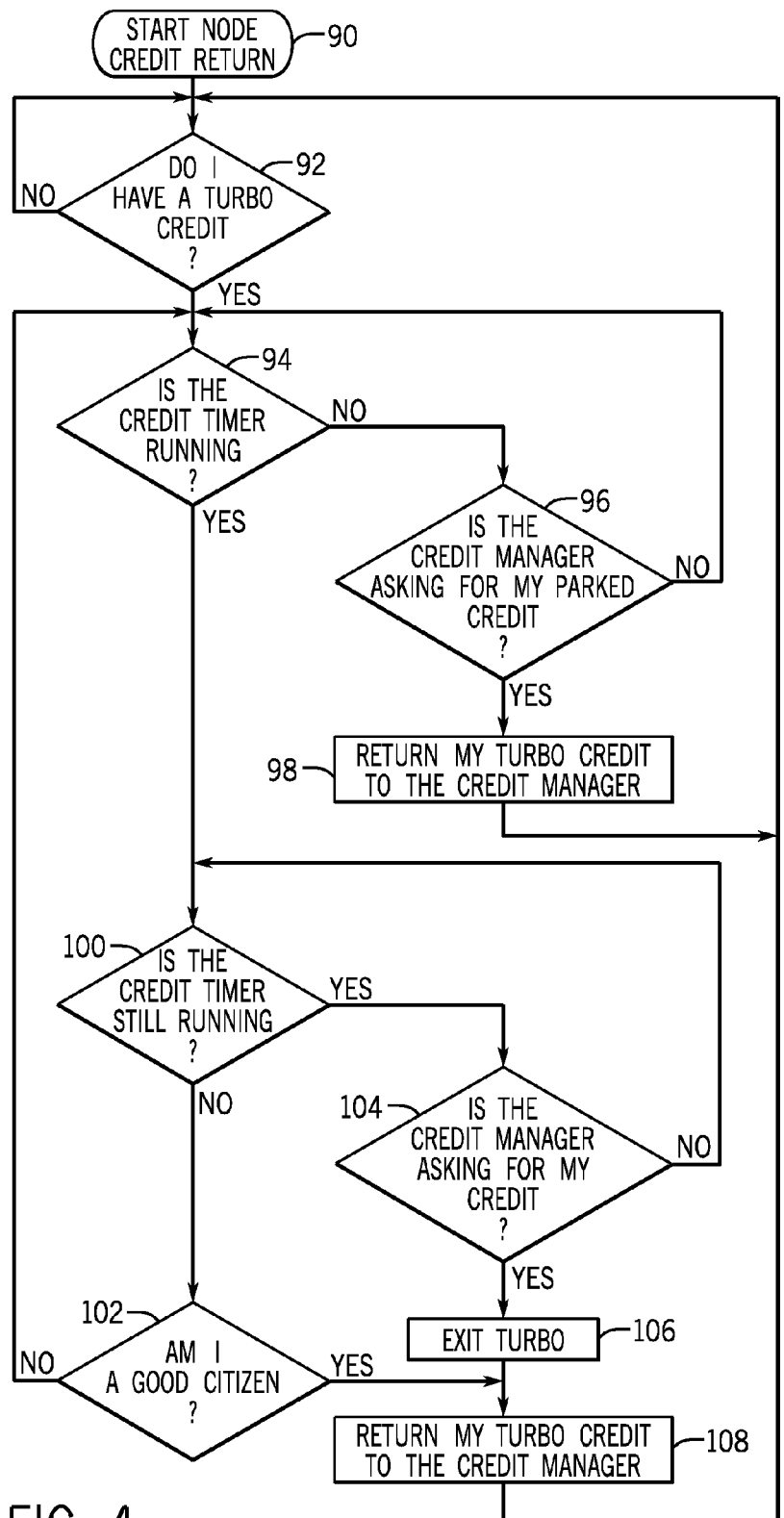
FIG. 4 is a start node credit return flow chart according to one embodiment.

A start node credit return sequence 90, shown in FIG. 4, may be implemented in software, firmware and/or hardware. In software and firmware modes it may be implemented by computer executed instructions stored in one or more non-transitory computer readable media such as a magnetic, optical or semiconductor storage.

The sequence shown in FIG. 4 begins by determining if the node has a turbo credit (diamond 92). If so, a check at 94 determines whether the credit timer is running. If so, a check at diamond 100 determines if the credit timer is still running and if not, a check at diamond 102 determines whether or not the node is a good citizen node.

If the check at diamond 94 indicates that the credit timer is not running, then a check at diamond 96 determines whether the credit manager is requesting a parked credit from the node. If so, the credit is returned to the credit manager in block 98.

If the check at diamond 100 indicates that the credit timer is still running, then a check at diamond 104 determines if the credit manager is asking for the credit from the node. If so, the node exits the higher power consumption mode at block 106. Then at block 108, the credit is returned to the credit manager.

A baseboard management controlling (BMC) may limit bandwidth to a node, such as a core, socket, memory, or any port that communicates externally, including Ethernet and Serial Advance Technology Attachment (SATA) ports, as examples, in some embodiments. The BMC may receive sensor inputs and, based on these inputs, may dynamically adjust power consumption of a platform. The BMC may communicate its power consumption determinations to a processor for execution. For example, the BMC may count memory transactions and cut off a memory without a credit that exceeds a maximum number of transactions. Likewise, the BMC may coordinate power delivery with the platform level power management.

The BMC may dynamically adjust the number of credits available based on its sensor readings, available battery capacity, or available power supply capacity, to mention some examples. It may transition a system between good citizen and park modes using the same information.

Figure 5:
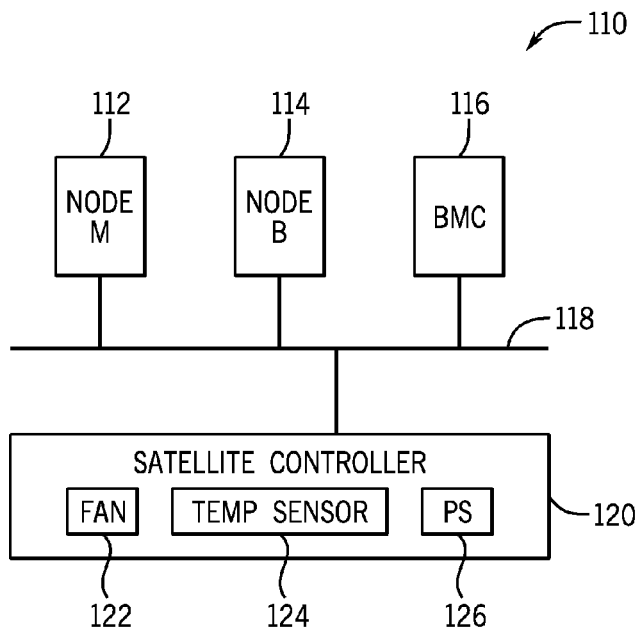
FIG. 5 is a depiction of a baseboard management controller according to one embodiment.

A system 110, including a baseboard management controller (BMC) 116, may include a number of nodes, such as the nodes 112 and 114, coupled to a bus 118, as shown in FIG. 5. Also, coupled to the bus 118 may be a satellite controller 120. The satellite controller may receive information from fans or fan controls 122, a temperature sensor 124, and power supplies 126. Thus, it may get information about the capabilities of a power supply and the current thermal conditions inside a platform. It may also receive information about capabilities of components, available battery supply, or other information. Then it may provide this information to BMC 116. The BMC 116 can then use this information to control whether the platform is in the good citizen or park mode and to dynamically adjust the number of available credits.

Figure 6:
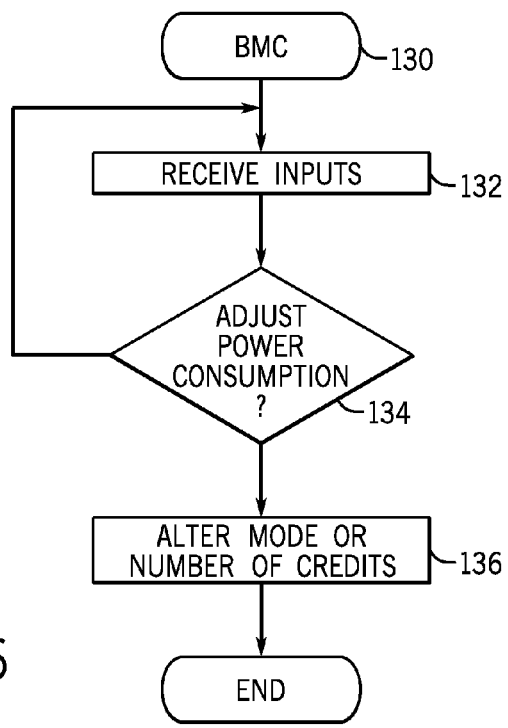
FIG. 6 is a flow chart for a baseboard management controller according to one embodiment.

Referring to FIG. 6, a baseboard management controller sequence 130 may be implemented in software, firmware and/or hardware. In software and firmware embodiments, it may be implemented by computer executed instructions stored in one or more non-transitory computer readable media, such as a magnetic, semiconductor, or optical storage. It may be implemented by a baseboard management controller, in one embodiment.

The sequence 130 begins by receiving inputs from the satellite controller 120 as indicated at block 132. Then, a check at diamond 134 determines whether the power consumption of the platform should be adjusted. If so, the mode, be it good citizen or park mode, may be changed and/or the number of credits may be increased or decreased as indicated in block 136. If not, the flow iterates back to the beginning to receive more inputs.

In some embodiments, different types of credits may be allocated to each device type, such as memory, fabric, network interface cards, processors, sockets, etc. The different credit types may have different values in terms of allowed power consumption.

The following clauses and/or examples pertain to further embodiments:

One example embodiment may be a method comprising in a processor based system, allowing some components to consume power at a given level while preventing other components from consuming power at that same given level. The method may also include allowing some components to consume power at a maximum level while preventing other components from doing so. The method may also include allocating a number of credits less than a total number of components that consume power to said system, each credit allowing one component to consume power at said level. The method may also include allocating a credit to a component upon request if a credit is available. The method may also include if a credit is not available, transferring a credit held by another component to a credit requesting component. The method may also include requiring a component to surrender a credit after using the credit. The method may also include tracking the amount of time that a component has a credit and placing a limit on that time, such that the credit is surrendered after that time. The method may also include setting the system selectively to one of a first mode wherein credits are released by a component after the component is done with a credit and a second mode wherein the component keeps the credit until it is asked to return the credit. The method may also include maintaining a table indicating how long each component has held a credit. The method may also include using said table to pick a component that must return its credit.

Another example embodiment may be at least one non-transitory computer readable medium storing instructions for execution by a processor to perform a sequence comprising allowing some components to consume power at a given level while preventing other components capable of consuming power at the given level from consuming power at that same given level. The media may further store instructions to perform a sequence including allowing some components to consume power at a maximum level while preventing other components from doing so. The media may further store instructions to perform a sequence including allocating a number of credits less than a total number of components that consume power to said system, each credit allowing one component to consume power at said level. The media may further store instructions to perform a sequence including allocating a credit to a component upon request if a credit is available. The media may further store instructions to perform a sequence including if a credit is not available, transferring a credit held by another component to a credit requesting component. The media may further store instructions to perform a sequence including requiring a component to surrender a credit after using the credit. The media may further store instructions to perform a sequence including tracking the amount of time that a component has a credit and placing a limit on that time, such that the credit is surrendered after that time. The media may further store instructions to perform a sequence including setting the system selectively to one of a first mode wherein credits are released by a component after the component is done with a credit and a second mode wherein the component keeps the credit until it is asked to return the credit. The media may further store instructions to perform a sequence including maintaining a table indicating how long each component has held a credit. The media may further store instructions to perform a sequence including using said table to pick a component that must return its credit.

In another example embodiment may be an apparatus comprising a first power consuming component, a second power consuming component, and a processor to allow the first component to consume power at a given level while preventing the second component from consuming power at that same given level. The apparatus may include said processor to allow the first component to consume power at a maximum level while preventing the second component from doing so. The apparatus may include said processor to allocate a number of credits less than a total number of components that consume power to said apparatus, each credit allowing one component to consume power at said level. The apparatus may include said processor to allocate a credit to a component upon request if a credit is available. The apparatus may include if a credit is not available, said processor to transfer a credit held by another component to a credit requesting component. The apparatus may include said processor to require a component to surrender a credit after using the credit. The apparatus may include said processor to track the amount of time that a component has a credit and place a limit on that time, such that the credit is surrendered after that time. The apparatus may include said processor to set the apparatus selectively to one of a first mode wherein credits are released by a component after the component is done with a credit and a second mode wherein the component keeps the credit until it is asked to return the credit. The apparatus may include wherein said first and second components are cores. The apparatus may include wherein said first and second components are memories.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   in a processor based system allocating credits that enable first components to consume power in a turbo mode simultaneously while preventing second components without said credits from consuming power in the turbo mode, the turbo mode enables each component to operate at a maximum power consumption level and at maximum speed;
   at boot time, selecting either a first mode or a second mode for operation of said first components, said system enabling both first and second modes, in said first mode said first components return credits to operate no longer in said turbo mode after expiration of a time period and in said second mode said first components return credits to operate no longer in said turbo mode only upon request from another component in said system; and
   wherein the total number of components in said system that consume power is more than said allocated number of credits, each credit allowing one component to consume power in said turbo mode.

2. The method of claim 1 including allowing some components to consume power at a maximum level while preventing other components from doing so.

3. The method of claim 1 including allocating a credit to a component upon request if a credit is available.

4. The method of claim 3 including if a credit is not available, transferring a credit held by another component to a credit requesting component.

5. The method of claim 1 including requiring a component to surrender a credit after using the credit.

6. The method of claim 5 including tracking the amount of time that a component has a credit and placing a limit on that time, such that the credit is surrendered after that time.

7. The method of claim 1 including setting the system selectively to one of a first mode wherein credits are released by a component after the component is done with a credit and a second mode wherein the component keeps the credit until it is asked to return the credit.

8. The method of claim 1 including maintaining a table indicating how long each component has held a credit.

9. The method of claim 8 including using said table to pick a component that must return its credit.

10. At least one non-transitory computer readable medium storing instructions for execution by a processor in a processor based system to perform a sequence comprising:
    allocating credits that enable first components to consume power in a turbo mode simultaneously while preventing second components without said credits from consuming power in the turbo mode, the turbo mode enables each component to operate at a maximum power consumption level and at maximum speed;
    selecting either a first mode or second mode for operation of said first components, said system enabling both first and second modes, in said first mode said first components return credits to operate no longer in said turbo mode after expiration of a time period and in said second mode said first components return credits to operate no longer in said turbo mode only upon request from another component in said system; and wherein the total number of components in said system that consume power is more than said allocated number of credits, each credit allowing one component to consume power in said turbo mode.

11. The medium of claim 10, said sequence including allowing some components to consume power at a maximum level while preventing other components from doing so.

12. The medium of claim 10, said sequence including allocating a credit to a component upon request if a credit is available.

13. The medium of claim 12, said sequence including if a credit is not available, transferring a credit held by another component to a credit requesting component.

14. The medium of claim 10, said sequence including requiring a component to surrender a credit after using the credit.

15. The medium of claim 14, said sequence including tracking the amount of time that a component has a credit and placing a limit on that time, such that the credit is surrendered after that time.

16. The medium of claim 10, said sequence including setting the system selectively to one of a first mode wherein credits are released by a component after the component is done with a credit and a second mode wherein the component keeps the credit until it is asked to return the credit.

17. The medium of claim 10, said sequence including maintaining a table indicating how long each component has held a credit.

18. The medium of claim 17, said sequence including using said table to pick a component that must return its credit.

19. A system comprising:
a first power consuming component;
a second power consuming component; and
a processor to allocate credits that enable multiple components including the first component to consume power in a turbo mode simultaneously while preventing the second component from consuming power in the turbo mode, the turbo mode enables each component to operate at a maximum power consumption level and at maximum speed, and at boot time, the processor to select either a first mode or second mode for operation of said first component, said system enabling both first and second modes, in said first mode said first component returns credit to operate no longer in said turbo mode after expiration of a time period and in said second mode said first component returns credit to operate no longer in said turbo mode only upon request from another component in said system, and wherein the total number of components in said system that consume power is more than said allocated number of credits, each credit allowing one component to consume power in said turbo mode.

20. The system of claim 19, said processor to allow the first component to consume power at a maximum level while preventing the second component from doing so.

21. The system of claim 19, said processor to allocate a credit to a component upon request if a credit is available.

22. The system of claim 21, if a credit is not available, said processor to transfer a credit held by another component to a credit requesting component.

23. The system of claim 19, said processor to require a component to surrender a credit after using the credit.

24. The system of claim 23, said processor to track the amount of time that a component has a credit and place a limit on that time, such that the credit is surrendered after that time.

25. The system of claim 19, said processor to set the apparatus selectively to one of a first mode wherein credits are released by a component after the component is done with a credit and a second mode wherein the component keeps the credit until it is asked to return the credit.

26. The system of claim 19, wherein said first and second components are cores.

27. The system of claim 19, wherein said first and second components are memories.

* * * * *